(12) United States Patent
Strauss et al.

(10) Patent No.: US 9,855,663 B1
(45) Date of Patent: Jan. 2, 2018

(54) AUTOMATED DIGIT INTERCHANGE

(71) Applicant: X Development LLC, Mountain View, CA (US)

(72) Inventors: Marc Strauss, Fremont, CA (US); David Youmans, San Francisco, CA (US); Scott Stanford, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/186,393

(22) Filed: Jun. 17, 2016

(51) Int. Cl.
*B25J 15/04* (2006.01)
*B25J 15/08* (2006.01)

(52) U.S. Cl.
CPC ......... *B25J 15/08* (2013.01); *B25J 15/0408* (2013.01); *B25J 15/0433* (2013.01); *B25J 15/0475* (2013.01)

(58) Field of Classification Search
CPC ......... B25J 15/08; B25J 15/04–15/0491; B25J 15/0206; Y10S 483/901
USPC ................................................ 294/106, 198
See application file for complete search history.

(56) References Cited

U.S. PATENT DOCUMENTS

| | | | | |
|---|---|---|---|---|
| 4,545,723 A | * | 10/1985 | Clark | B25J 15/04 294/86.4 |
| 4,636,135 A | * | 1/1987 | Bancon | B25J 15/0491 29/26 A |
| 4,699,414 A | | 10/1987 | Jones | |
| 4,913,617 A | * | 4/1990 | Nicholson | B25J 9/0084 294/86.4 |
| 5,172,951 A | | 12/1992 | Jacobsen et al. | |
| 5,256,128 A | | 10/1993 | Neumann | |
| 5,360,249 A | * | 11/1994 | Monforte | B25J 15/0475 294/119.1 |
| 8,322,766 B1 | * | 12/2012 | Hsiung | B25J 11/0095 294/213 |
| 8,382,177 B2 | | 2/2013 | Rizk et al. | |
| 8,602,470 B2 | | 12/2013 | Bieler | |
| 8,936,289 B1 | | 1/2015 | Kozlowski et al. | |
| 8,939,487 B2 | * | 1/2015 | De Koning | B25J 15/02 294/119.1 |
| 8,991,885 B2 | * | 3/2015 | Claffee | B25J 9/0015 294/111 |
| 9,010,819 B2 | * | 4/2015 | Mueller | B65G 11/023 294/86.4 |
| 9,039,057 B2 | | 5/2015 | Schvalb et al. | |
| 9,199,376 B2 | | 12/2015 | Wells et al. | |
| 2013/0313791 A1 | * | 11/2013 | Setrakian | B25J 15/0019 279/143 |

(Continued)

*Primary Examiner* — Dean J Kramer
(74) *Attorney, Agent, or Firm* — McDonnell Boehnen Hulbert & Berghoff LLP

(57) ABSTRACT

A robotic device is provided. The robotic device includes a first detachable digit, including a first connector piece. The robotic device also includes a digit mounting apparatus, including a first pivot joint and a second connector piece coupled to the first pivot joint, where the second connector piece is configured to mate with the first connector piece of the first detachable digit. The robotic device also includes an actuator configured to pivot the first pivot joint about a first axis to cause the second connector piece of the digit mounting apparatus to mate with the first connector piece of the first detachable digit to attach the first detachable digit to the digit mounting apparatus.

18 Claims, 12 Drawing Sheets

(56) References Cited

U.S. PATENT DOCUMENTS

2015/0298319 A1 10/2015 Guo et al.
2016/0008988 A1 1/2016 Kennedy et al.

* cited by examiner

AUTOMATED DIGIT INTERCHANGE

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), enveloping, ingressive (such as a pin or needle), astrictive (such as a vacuum or suction element) or contigutive (requiring contact for adhesion, such as glue).

SUMMARY

The present application discloses implementations that relate to a digit interchange system. A digit interchange system may include a plurality of digits to which a robotic device may have access. The robotic device (e.g., a robotic arm) may select one or more digits from the plurality of digits in order to attach the selected one or more digits to the robotic device. Further, the digit interchange system may include a digit mounting apparatus that the robotic device may use to interchange digits. In an embodiment, the robotic device may use the same actuator to interchange digits and to control attached digits.

In one example, the present application describes a robotic device. The robotic device includes a first detachable digit, including a first connector piece. The robotic device also includes a digit mounting apparatus, including a first pivot joint and a second connector piece coupled to the first pivot joint, where the second connector piece is configured to mate with the first connector piece of the first detachable digit. The digit mounting apparatus also includes an actuator configured to pivot the first pivot joint about a first axis to cause the second connector piece of the digit mounting apparatus to mate with the first connector piece of the first detachable digit to attach the first detachable digit to the digit mounting apparatus.

In another example, a method is described. The method involves selecting, from a plurality of digits, a digit to couple to a digit mounting apparatus, where the selected digit includes a first connector piece, and where the digit mounting apparatus includes a pivot joint and a second connector piece coupled to the pivot joint. The method also involves causing an actuator of the digit mounting apparatus to pivot the pivot joint to cause the second connector piece of the digit mounting apparatus to mate with the first connector piece of the selected digit. After causing the second connector piece of the digit mounting apparatus to mate with the first connector piece of the selected digit, the method further includes causing the actuator to pivot the pivot joint to cause the selected digit to manipulate an identified object.

In a third example, a robotic device is described. The robotic device includes a plurality of detachable digits, where each digit includes a respective first connector piece. The robotic device also includes a digit mounting apparatus, including a first pivot joint and a second connector piece coupled to the first pivot joint, where the second connector is configured to mate with the respective first connector piece of each digit of the plurality of digits. The robotic device further includes an actuator configured to pivot the first pivot joint about a first axis. The robotic device also includes a control system configured to select, from the plurality of digits, a digit to couple to the digit mounting apparatus. The control system is further configured to cause the actuator of the digit mounting apparatus to pivot the first pivot joint to cause the second connector piece of the digit mounting apparatus to mate with a respective first connector piece of the digit. After causing the second connector piece of the digit mounting apparatus to mate with the respective first connector piece of the digit, the control system is additionally configured to cause the actuator to pivot the first pivot joint to cause the digit to manipulate an identified object.

In another example, a system is described that includes means for selecting, from a plurality of digits, a digit to couple to a digit mounting apparatus, where the selected digit includes a first connector piece, and where the digit mounting apparatus includes a pivot joint and a second connector piece coupled to the pivot joint. The system further includes means for causing an actuator of the digit mounting apparatus to pivot the pivot joint to cause the second connector piece of the digit mounting apparatus to mate with the first connector piece of the selected digit. The system also includes means for, after causing the second connector piece of the digit mounting apparatus to mate with the first connector piece of the selected digit, causing the actuator to pivot the pivot joint to cause the selected digit to manipulate an identified object.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
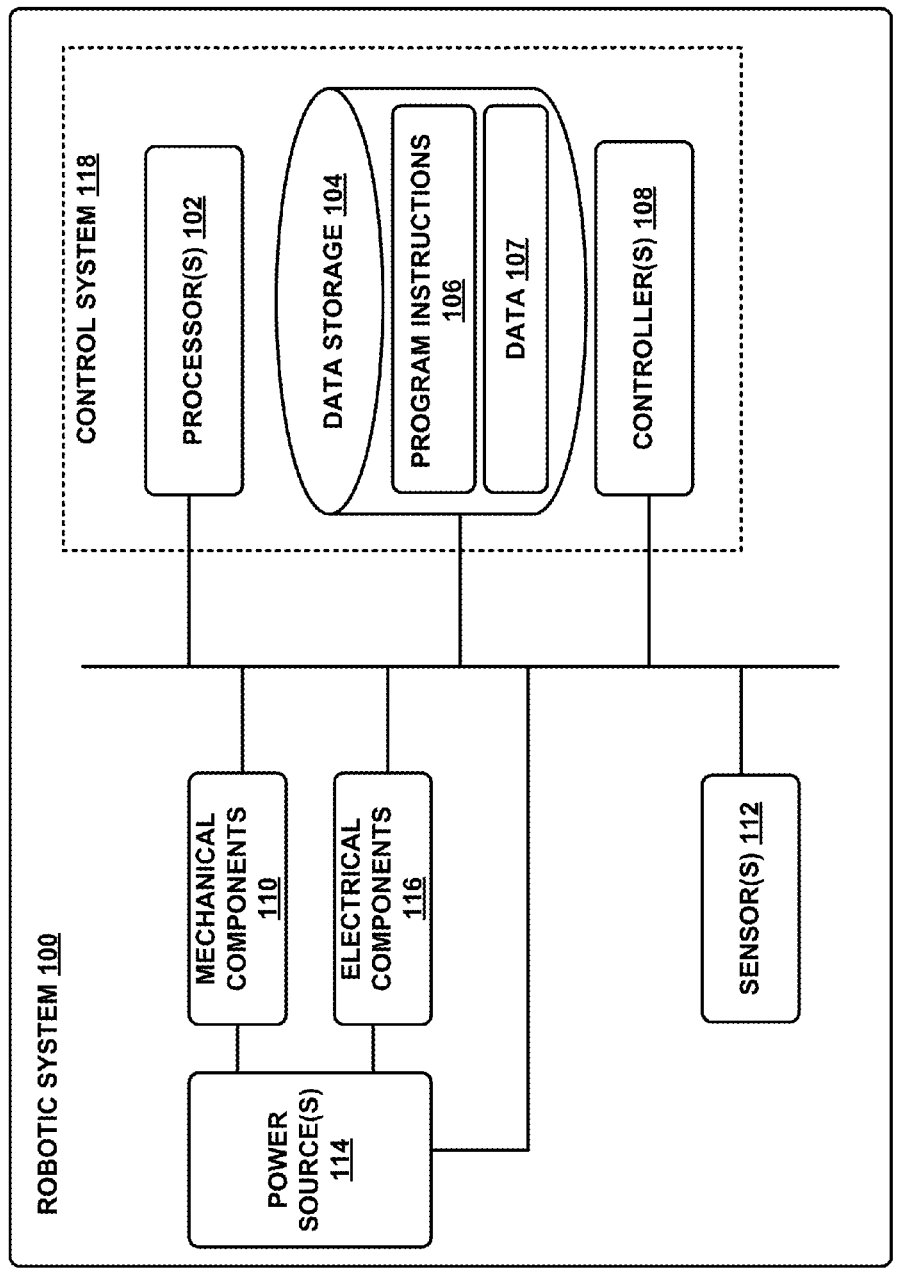
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. Overview

As explained above, various types of robotic devices are being created for performing a variety of tasks that may assist users. For example, a robotic device may interact with objects while performing an assigned task. The tools that a robotic device may use to interact with objects are defined as end of arm tooling (EOAT). In particular, the robotic device may include a tool or an "end effector." In an example, an end effector may be a gripper which includes digits (also referred to herein interchangeably as "fingers") that may be used to grasp and manipulate objects.

Generally, the end effector of a robotic device includes digits that are not autonomously interchangeable. That is, an integrator may manually bolt one or more digits of a digit type to the robotic device. This configuration, however, may be inherently limiting as the digits may be task-specific and thus limited for use in a specific application or for a specific task. Thus, the number of tasks that the robotic device may perform may be limited. Some robotic device configurations include complex sensorization in order to increase the number of tasks that the robotic device may perform.

Nonetheless, even with sensorization, there may be tasks that may not possible to perform with non-interchangeable digits. Additionally, there may be tasks that may be possible to execute with a given digit, but may require a large grip force/torque to be applied. However, in some cases, a large grip force/torque may require a large actuator in order to exert the large grip force/torque. Increasing the actuator size may significantly increase the cost, size, mass, and complexity of the robotic device.

Some other robotic device configurations include swapping between actuated gripping digits for different tasks. Such configurations, however, are undesirable as swapping actuated gripping digits may be cumbersome and complex. For example, each actuated gripping digit requires electrical connections in order to provide power to the actuators of the actuated gripping digit when the actuated gripping digit is attached to a robotic device. Including electrical connections in the actuated gripping digits may place significant constraints when designing actuated gripping digits that can be swapped. Thus, the number of actuated gripping digits that may be used with a robotic device may be limited due to the high cost and complexity of the actuated gripping digits.

Disclosed herein is a system for digit interchange that may be used by a robotic device to autonomously swap between one or more digits that can be attached to a robotic device. Such a system may allow the robotic device to replace or swap its own digits on the fly. For example, the robotic device may use the system to swap between one or more digits based on its currently assigned task. That is, the robotic device may select one or more digits from a plurality of digits (which are accessible to the robotic device) based on the task. Such an interchange system may allow a robotic device to perform tasks that may be difficult or impossible to perform with fixed digits.

Further, the digit interchange system may allow the robotic device to interchange passive digits. Thus, rather than swapping out an actuated gripping digit, the digit interchange system may allow the robotic device to swap out passive digits that don't include electrical connections since, as explained herein, the actuator remains on the robotic device. Passive digits may have a simple design and may be manufactured cheaply. Thus, a robotic device may have a wide range of passive digits that may be used for different tasks. In another example, the digit interchange system may allow the robotic device to autonomously replace old digits, which may have deteriorated due to wear and tear, with newer digits. In another example, the digit interchange system may allow the robotic device to autonomously replace dirty digits with clean ones. The passive dirty digits may be easily cleaned and made available to the robotic device again. Other advantages of the digit interchange system are disclosed herein.

In an embodiment, the digit interchange system may include a plurality of digits that are accessible to a robotic device. For example, the digits may be stored in a holster that may be attached to the robotic device or that may be located near the robotic device. Further, two or more of the digits may form a digit set. For example, a digit set may include a pair of opposable digits that may function as a gripper. Furthermore, different digits may be of different digit types. Additionally and/or alternatively, different digits may have different geometries. End-users and/or designers may create their own (task-specific) digits that can be included in the plurality of digits available to a robotic device.

The digit interchange system may also include a connection mechanism that may be used to couple between a robotic device and one or more digits. For example, the connection mechanism may include a digit mounting apparatus coupled to the robotic device. In such an example, the digit mounting apparatus and each digit may include a connector piece (also referred to herein as a "link"). The connector pieces may be designed such that a connector piece on a digit is complementary to a connector piece on the digit mounting apparatus. Thus, the robotic device may attach one or more digits to the digit mounting apparatus by mating the one or more connector pieces of the digit mounting apparatus to the connector pieces of the one or more digits. The robotic device may control the digits once they are attached to the digit mounting apparatus.

In an embodiment, the digit mounting apparatus may include an actuator that may be used to control the motion of attached digits. The motion of the digits may be a rotary motion, a linear motion, or a combination thereof (e.g., linkage). In an example, the actuator may be coupled to a pivot joint that rotates about an axis, and the movement of an attached digit may be controlled by the pivot joint. As such, the actuator can cause the pivot joint to pivot, which may cause the attached digit to move in a rotary motion. In another example, the actuator may cause two opposable digits attached to the robotic device, which function as a gripper, to move towards each other in a pinching motion. In this example, the actuator may be a single actuator that controls the movement of both digits. Alternatively, a separate actuator may be coupled to each digit.

In an embodiment, the digit mounting apparatus may use the same actuator, which controls the motion of an attached digit, to attach the digit to the digit mounting apparatus. That is, the actuator may cause the digit mounting apparatus (or a component thereof) to move in a motion that attaches a digit to the digit mounting apparatus. The actuator may cause the digit mounting apparatus to move in a rotary and/or a linear motion. For example, a digit may be connected to a first connector piece and a pivot joint of the digit mounting apparatus may be connected to a second connector piece. In this example, the first and second connector pieces may be designed such that the pieces may mate together when the actuator causes the second connector piece to move towards the first connector piece using the same rotary motion of the pivot joint that is used to control the motion of an attached digit.

Such a design of using the same actuator (and by extension the same motion) for coupling to a digit and for controlling the attached digit decreases the number of actuators that may be required in a digit mounting apparatus. Decreasing the number of actuators decreases the size, mass, design complexity, and cost of a robotic device.

The digit mounting apparatus actuator may also be used to detach digits from the digit mounting apparatus. Each of the digits may include an engagement feature (in some examples referred to as an "ejection feature) that may engage a complementary feature in a holster as the digit is placed in the holster. For example, a digit may be attached to the robotic device using a connection mechanism that includes two connector pieces (i.e., a connector piece on each of the digit and the robotic device). In such an example, the robotic device may decouple the second connector piece (of the digit mounting apparatus) that is mated with the first connector piece (of the digit) by causing the actuator to pivot the pivot joint after the engagement feature of the digit engages the complementary engagement feature of the holster. The pivoting motion may decouple the connector pieces and the robotic device may detach from the digit. Accordingly, the digit interchange system may allow for an interchange of digits using a single actuator of a digit mounting apparatus.

Also disclosed herein is a control system that determines which one or more digits to select from a plurality of digits. For example, a robotic device may include a control system to select a digit or a digit set from a plurality of digits that may be stored in a holster. In an embodiment, the selection may be based on the type of task. In some examples, the plurality of digits may include task-specific digits. In such examples, the control system may select the digit or the digit set that is associated with the type of task assigned to the robotic device. In other examples, the task type may be a type for which a task-specific digit does not exist or is not included in the plurality of digits available to the robotic device. In such examples, the control system may determine, based on one or more factors, which of the available digits to use.

For example, the control system may analyze an object with which the robotic device may be interacting while performing the assigned task. The control system may use sensor data to analyze the object in order to determine one or more characteristics of the object. For example, the control system may determine the shape, dimensions, and classification of the object. Based on the analysis, the control system may calculate the respective force/torque and/or the contact forces needed to perform a task using each of the available digits and/or digit sets. In an embodiment, the control system may select the one or more digits that require the least amount of force/torque and/or the lowest contact forces to perform the task.

A robotic device that has the ability to interchange between digits may perform a given task using less force/torque than a fixed-digit robotic device by selecting the one or more digits that require the least amount of force/torque (from the available digits) to perform the given task. As such, the size of the actuator of the digit mounting apparatus may be decreased as the digit interchange system may decrease the force/torque requirements on the actuator. A smaller actuator decreases the size, complexity, and cost of the digit mounting apparatus and/or robotic device.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

In an example, the data storage 104 may be a remote server (e.g., cloud server) in which the robotic device 100 may store data 107. The robotic device may also retrieve the data 107 from the remote server. The server may include one or more servers, such as one or more of a communications server, an application server, a file server, a database server, and a web server. A server may be referred to as a "computer server." The data transfer between the robotic device 100 and the cloud server may be arranged according to a file transfer protocol (FTP), or according to another protocol.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, preshaper components, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. In other implementations, the robotic system 100 may include one or more detachable digits. Other types of removable components may be included within some implementations.

The robotic system 100 may include sensor(s) 112 arranged to sense aspects of the robotic system 100. The sensor(s) 112 may include one or more force sensors, force/torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, preshaper components, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems (e.g., internal combustion engines, fuel cells, hamster wheels, etc.). As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
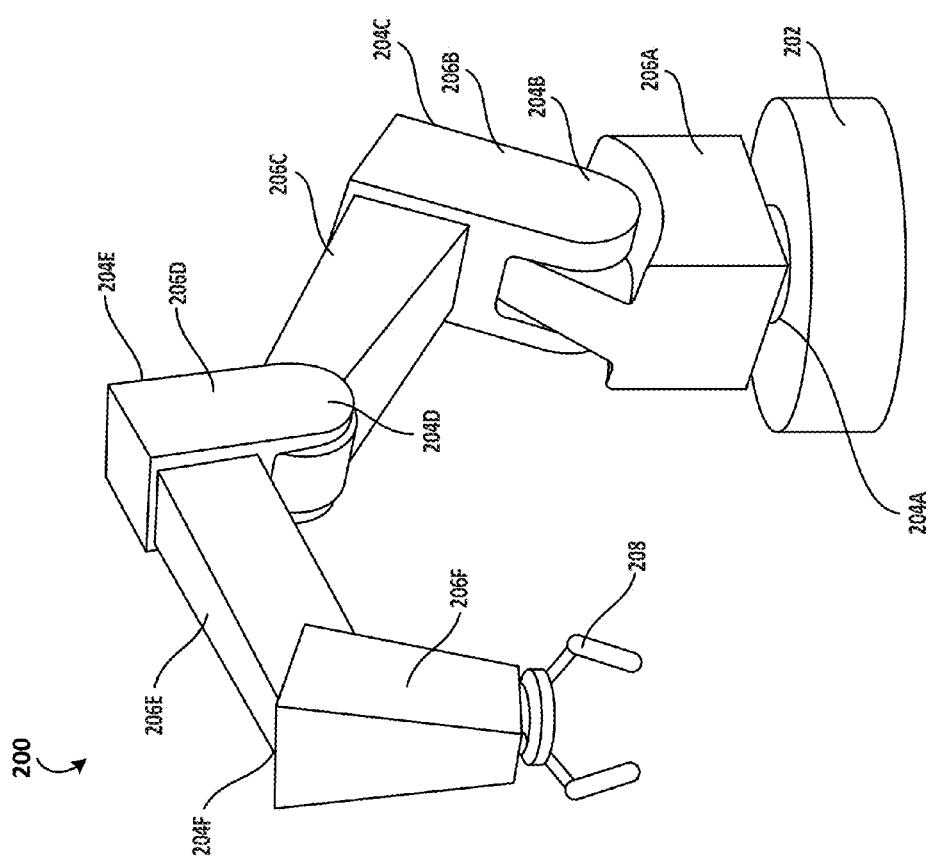
FIG. 2 illustrates an example robotic arm, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Note that the end effector 208 may be a detachable end effector such that the robotic arm 200 may swap out the end effector 208 with a different end effector. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, force/torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. Example Digit Interchange System

As noted above, the present disclosure includes implementations that relate to a digit interchange system. The digit interchange system may be used by a robotic device to autonomously swap between digits. The ability to autonomously swap between digits allows a robotic device to perform a wider range of tasks than a robotic device with permanent digits (i.e., digits that are not autonomously interchangeable). Further, the digit interchange system may select one or more digits based on the amount of force/torque and/or contact forces required for a given task. As such, the digit interchange system may select the one or more digits that require the least amount of force/torque and/or the lowest contact forces to perform the task. The ability to select one or more digits that would decrease the amount of force/torque and/or contact forces required to perform the given task allows for a cheaper and more nimble robotic device design in comparison with a robotic device with fixed digits.

In an embodiment, the digit interchange system may include a plurality of digits that may be accessible to a robotic device. Further, two or more digits may make up a digit set. In some examples, a digit may be a task-specific digit, such as a screwdriver digit. In other examples, a digit may be a multitask digit, such as a gripper digit, that may be used for a variety of tasks. Within examples, different digits available to the robotic device may have different architectures. Additionally and/or alternatively, different digits may have the same general architecture but different geometries.

In an embodiment, one or more of the digits may be gripper digits. Gripper digits are digits with a deformable gripping surface that allow the gripper digit to grip objects of various geometries (e.g., objects without parallel opposing surfaces). Further, two or more gripper digits may make up a gripper digit set. For example, a gripper digit set may include two opposable gripper digits that may function as a gripper.

Figure 3A:
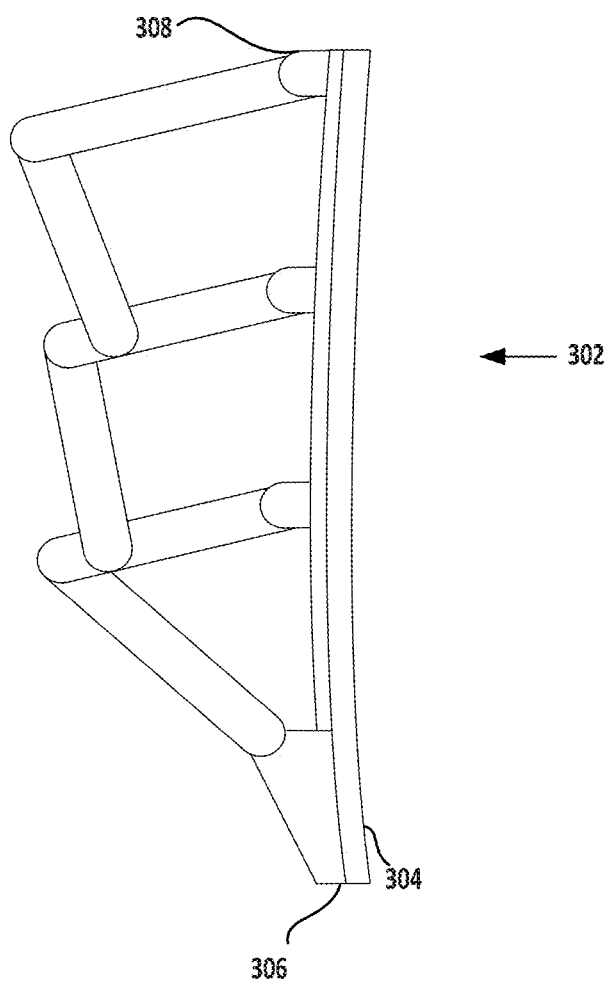
FIG. 3A illustrates an example digit, according to an example implementation.

FIG. 3A illustrates a gripper digit 302, according to an exemplary embodiment. The digit 302 includes a deformable gripping surface 304, a fingertip 306, and a base 308. Further, the digit 302 may include a fingernail or tapered section at the end of the fingertip 306. The fingernail may be a flat section that may be configured for gripping or sliding under an object.

The deformable gripping surface 304 may be a flexible plastic, rubber, or other material suitable for gripping an object. In some examples, the deformable gripping surface 304 may be a single or unitary component. In other examples, the deformable gripping surface 304 may include a plurality of members or sections coupled together end-to-end to create an elongated gripping surface.

Further, the deformable gripping surface 304 may be configured to be generally straight under normal circumstances such as when no pressure or force is applied to the surface and the digit is in a normal operating state. In other examples, the deformable gripping surface 304 may be configured to have a bend or curve under normal circumstances (i.e., a biased shape) such that when no pressure or force is applied to the gripping surface it is curved or bent nonetheless.

In some examples, the deformable gripping surface 304 may run the entire length of the digit 302 between the fingertip 306 and the base 308. In other examples, the deformable gripping surface 304 may be included on only a portion of an inner surface of the digit 302, such that only a portion of the digit 302 includes the deformable gripping surface 304. The deformable gripping surface 304 may deform, bend, curve, distort, warp, or otherwise alter its shape based on one or more factors, such as an impacting force of pressure. The base 308 may be a proximate end of the digit 302. Further, the fingertip 306 may be included at the distal end of the digit 302, and may be configured for gripping, grasping, or grabbing an object.

Figure 3B:
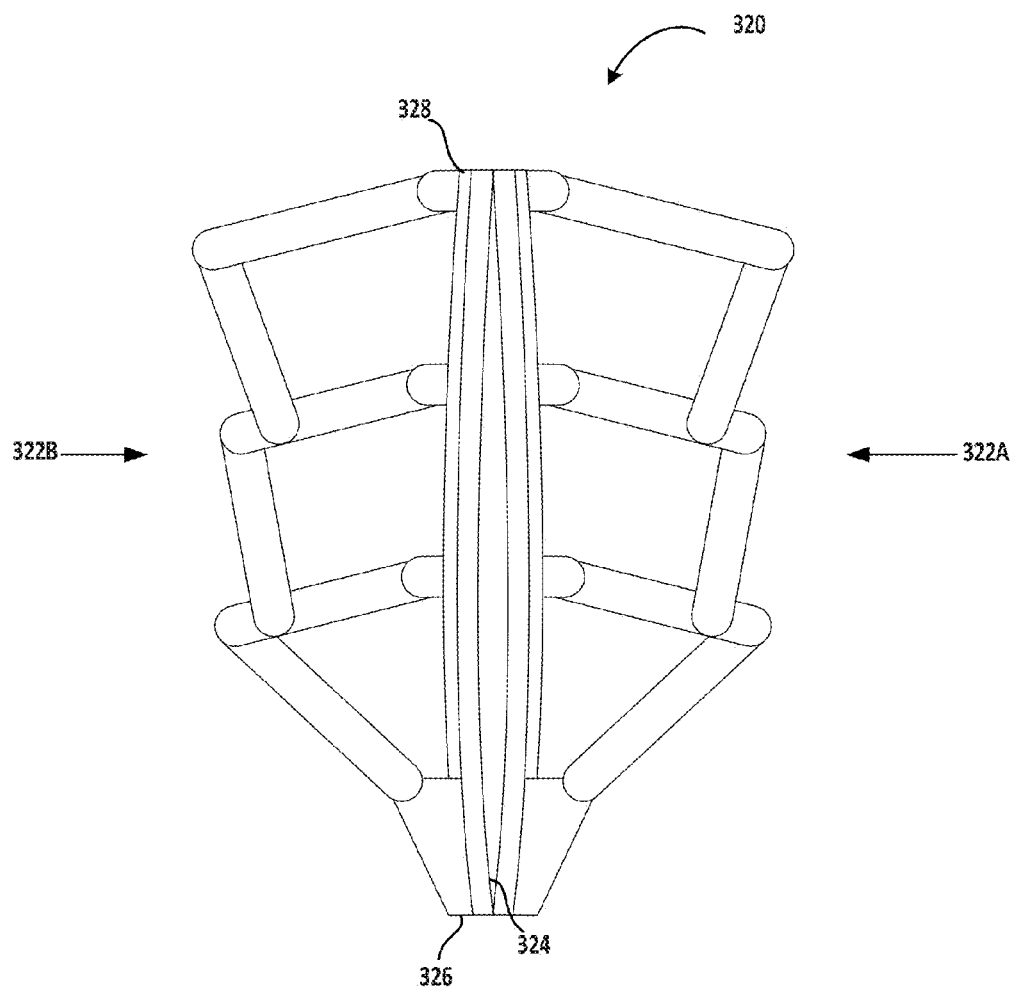
FIG. 3B illustrates an example gripper digit set, according to an example implementation.

FIG. 3B illustrates digits of a gripper digit set 320, according to an exemplary embodiment. The gripper digit set 320 includes two opposable digits 322A, 322B that may function as a gripper. As illustrated in FIG. 3B, each gripper digit may include a deformable gripping surface 324, a fingertip 326, and a base 328. In an embodiment, the gripper digit 302 in FIG. 3A may be shorter and wider than each of the gripper digits 322A, 322B. Other geometries of gripper digits are also possible. For example, some digits may be shorter, wider, taller, or narrower than the digits 322A, 322B. Further, some gripper digits may include a single rigid body (e.g., a hook digit).

Furthermore, digits may be underactuated or hyper-underactuated. Underactuated digits do not include phalanges that can be controlled independently. Underactuated digits require less complex control systems and are simpler to manufacture than fully actuated digits. Hyper-underactuated digits may be controlled by one actuator to move two or more digits. For instance, a single actuator may cause two hyper-underactuated opposable digits that close in a pinching manner to move toward each other to pinch an object.

Figure 4:
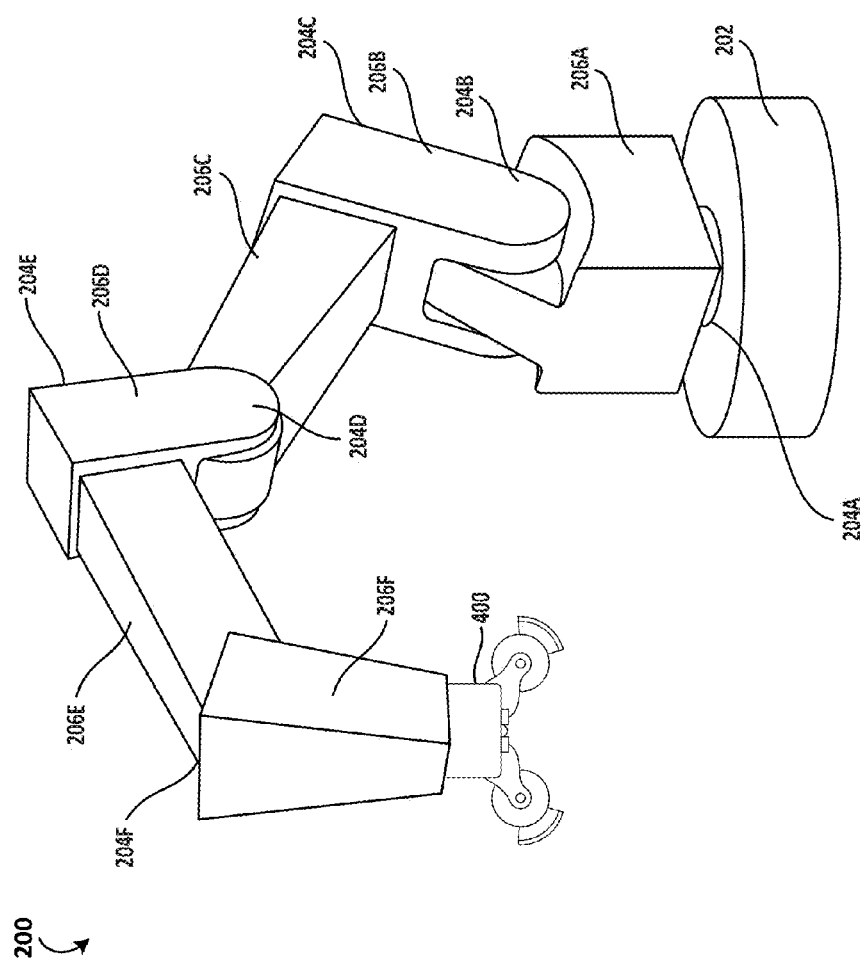
FIG. 4 illustrates an example robotic arm, according to an example implementation.

FIG. 4 illustrates the example robotic arm 200 with a digit mounting apparatus 400, according to an exemplary embodiment. In an embodiment, the digit mounting apparatus may be used to mount one or more digits to the robotic device. More specifically, a connection mechanism may be used to attach one or more digits to the digit mounting apparatus 400. The connection mechanism may include one or more connector pieces coupled to the digit mounting apparatus. The one or more connector pieces coupled to the digit mounting apparatus may be referred to as digit mounting apparatus connector pieces. Further, the number of the connector pieces that are coupled to a digit mounting apparatus may be the same number as the number of digits that can be connected to the digit mounting apparatus. For example, as illustrated in FIG. 4, two connector pieces may be coupled to the digit mounting apparatus 400. In such an example, one or two digits may be attached to the robotic arm 200.

Additionally, the connection mechanism may include a connector piece coupled to each digit included in the plurality of digits available to the robotic device. Each connector piece coupled to a digit may be referred to as a digit connector piece. In embodiments described herein, the robotic device may couple to one or more digits by mating the digit mounting apparatus connector pieces to the digit connector pieces of the one or more digits.

Figure 5A:
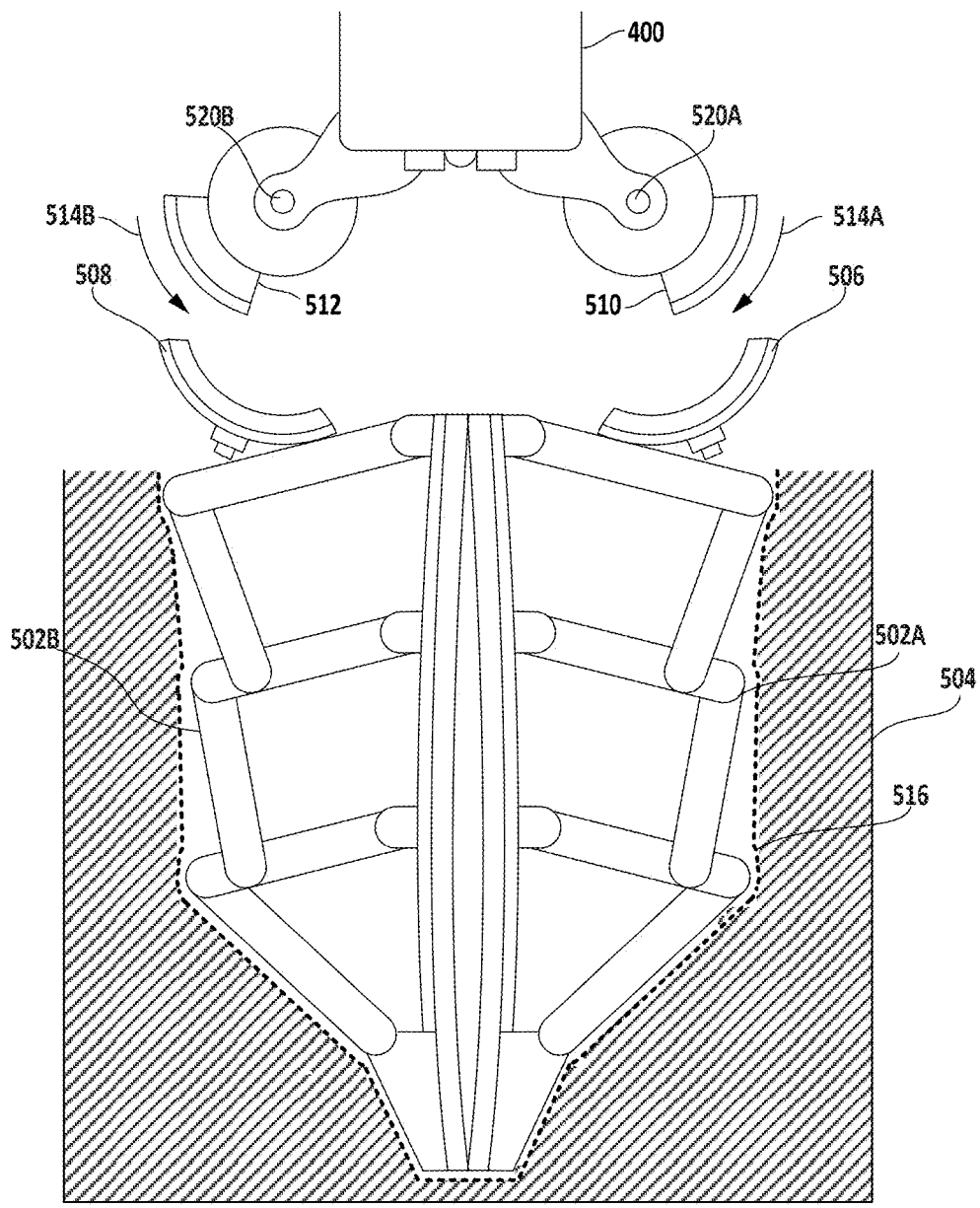
FIG. 5A illustrates a detached digit set and a digit mounting apparatus, according to an example implementation.

FIG. 5A illustrates the connection mechanism of a digit interchange system, according to an exemplary embodiment. Specifically, FIG. 5A illustrates the digit mounting apparatus 400 and a detached digit set (including two opposable digits) stored in a holster 504 (described in more detail below). Although the components illustrated in FIG. 5A are shown with a certain orientation and/or design, it should be understood that one or more components may be removed, added, and/or modified while remaining within the scope of this disclosure. Also, the orientation and combination of components may be changed based on the desired implementation.

As illustrated in FIG. 5A, the detached digit set may include two opposable digits 502A, 502B stored in the holster 504. A first connector piece (i.e., link) 506 is coupled to the digit 502A, and a second connector piece (i.e., link) 508 is coupled to the digit 502B. The digit mounting apparatus 400 may include a third connector piece 510 and a fourth connector piece 512. In an embodiment, the connector pieces coupled to the digits 502A, 502B may be complementary in shape to the connector pieces coupled to the digit mounting apparatus 400. That is, the first connector piece 506 and the second connector piece 508 may complementary in shape to the third connector piece 510 and the fourth connector piece 512 respectively.

Further, the third connector piece 510 and the fourth connector piece 512 may be arranged on the digit mounting apparatus 400 such that the third connector piece 510 and the fourth connector piece 512 can mate with the first connector piece 506 and the second connector piece 508 respectively. The mated pieces may form a connection between the digit mounting apparatus 400 and the digits 502A, 502B.

In an embodiment, a digit mounting apparatus may include at least one actuator and one or more pivot joints coupled to the at least one actuator. Further, one or more digit mounting apparatus connector pieces may be coupled to the one or more pivot joints. In an embodiment, the digit mounting apparatus may use the one or more actuator and the one or more pivot joints to cause digit mounting apparatus connection pieces to mate with digit connector pieces to mount digits on the digit mounting apparatus.

For example, the digit mounting apparatus 400 may include an actuator and two pivot joints 520A, 520B coupled to the actuator. Further, the third connector piece 510 may be coupled to the pivot joint 520A and the fourth connector piece 512 may be coupled to the pivot joint 520B. The actuator can cause the pivot joints 520A, 520B to pivot in the directions indicated by arrows 514A, 514B, respectively. Thus, the actuator can cause the connector pieces 510, 512 to pivot in the directions indicated by the arrows 514A, 514B respectively.

In an embodiment, the pivoting motion of the connector pieces 510, 512 may mate the connector piece 510 with the connector piece 506, and the connector piece 512 with the connector piece 508. Mating the digit mounting apparatus connector pieces 510, 512 with the digit connector pieces 506, 508 mounts the digits 502A, 502B onto the digit mounting apparatus 400. The digit mounting apparatus 400 may cause the actuator to pivot the pivot joints 520A, 520B simultaneously. As such, the digits 502A, 502B may simultaneously be mounted onto the digit mounting apparatus 400.

Figure 5B:
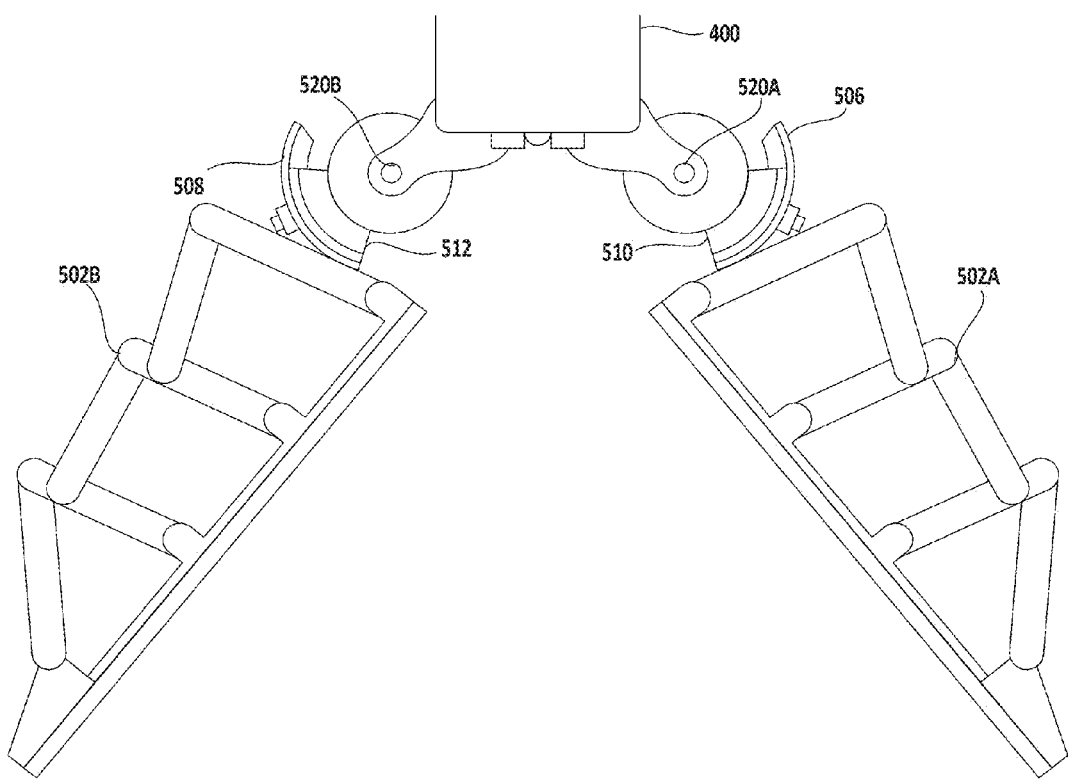
FIG. 5B illustrates an attached digit set in an open position, according to an example implementation.

FIG. 5B illustrates the digits 502A, 502B mounted onto to the digit mounting apparatus 400, according to exemplary embodiments. The robotic device may remove the digits 502A, 502B from the holster once the digits 502A, 502B are mounted onto the digit mounting apparatus 400. In an embodiment, the actuator of digit mounting apparatus 400 that was used to couple to the digit set may be configured to move the digits toward and away from each other. For example, the digits may each pivot about a fixed axis, such that the actuator moves the fingers from an open state illustrated in FIG. 5B to a closed state. The actuator may be configured to move the digits by set amounts, such that an angle is created by the digits, which can be measured in degrees, or radians, for example. For instance, the digits shown in FIG. 5B may be described as having an angle between them of 80 degrees (i.e., open), while digits that are closed may be described as having an angle between them of 0 degrees.

A robotic device may decouple one or more digits from a digit mounting apparatus in order to interchange between digits. The robotic device may decouple a digit from a digit mounting apparatus by placing the digit in a holding area in a holster. The holster may have specific locating geometry to fix the digit in place while the digit is being placed into the holster. In an embodiment, the locating geometry may substantially have the shape of the digit. The holster may also include generous lead-ins to help the robot device guide a digit mounting apparatus into a position for digit interchange.

Additionally, a digit may include an engagement feature that may assist the robotic device in decoupling from the digit. The holster may include a complementary engagement feature near the locating geometry for the digit. As such, a digit's engagement feature may engage the complementary engagement feature once the digit is placed in its holding area. The digit engagement feature engaging the complementary engagement feature of the holster, as described below, may assist the robotic device in detaching from the digit. When two or more digits are being decoupled from the digit mounting apparatus, the digits may be placed in the holster while the digits are in a closed position (i.e., the angle between them is 0 degrees).

Figure 5C:
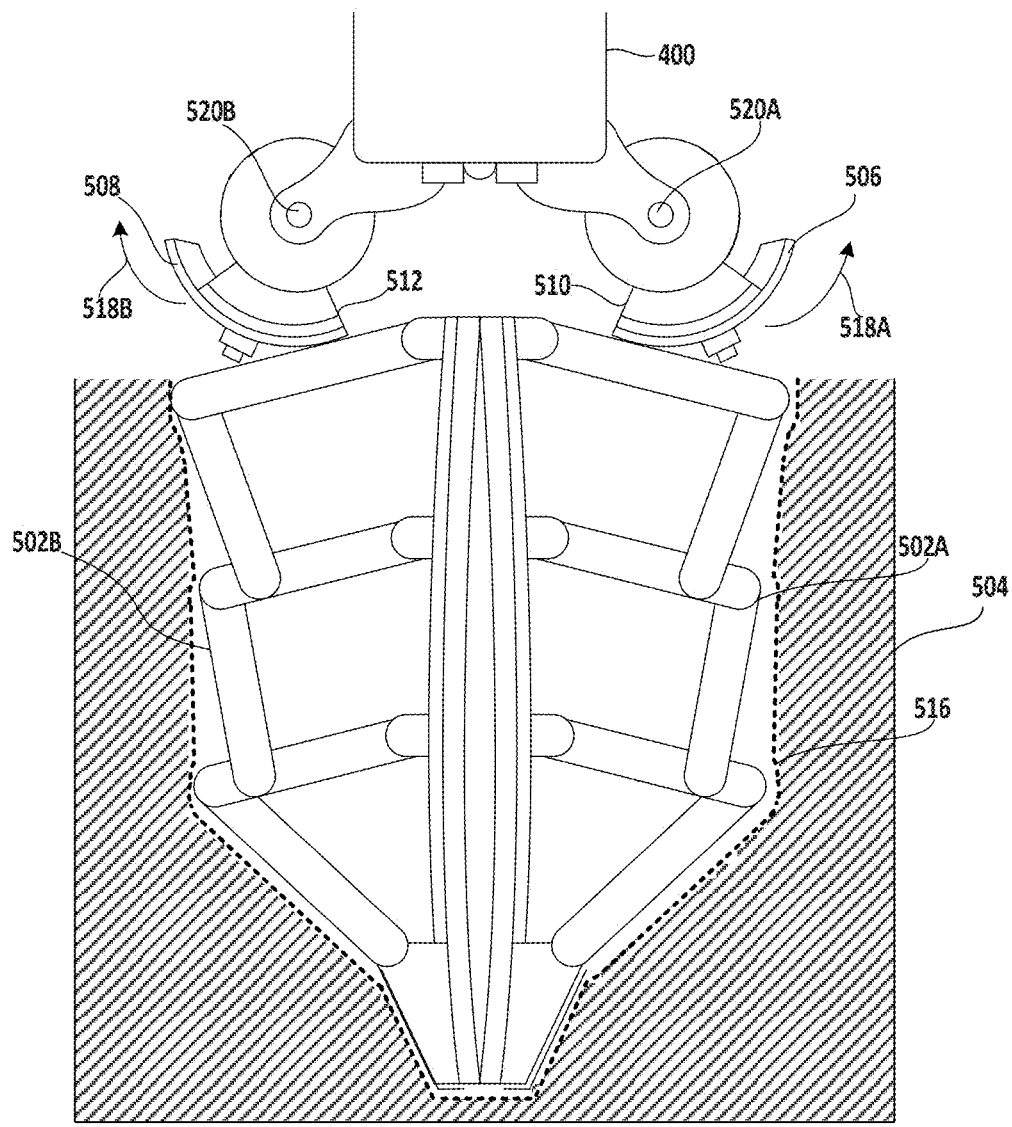
FIG. 5C illustrates an attached digit set in a closed position, according to an example implementation.

FIG. 5C illustrates the digits 502A, 502B placed in the holster 504, according to an exemplary embodiment. As illustrated in FIG. 5C, the digits 502A, 502B are placed in the holster while they are in a closed position in order for the digit mounting apparatus to decouple the digits 502A, 502B. For example, once the digits 502A, 520B are secured in their holding area 516 in the holster 504, the robotic device may cause the actuator to rotate the pivot joints 520A, 520B in respective directions indicated by arrows 518A, 518B. The rotation may cause a respective force on the connector pieces 506, 508 in the respective direction indicated by arrows 518A, 518B since the connector pieces 506, 508 are still coupled to the connector pieces 510, 512. However, the holster 504 may exert an opposite force on the connector pieces 506, 508 due to the engagement features of the connector pieces 506, 508 being engaged with the complementary engagement features of the holster 504. Thus, the opposite force may allow the connector pieces 510, 512 to decouple from the connector pieces 506, 508 by causing the connector pieces 506, 508 to resist the rotary motion of the connector pieces 510, 512. In an embodiment, the actuator of the digit mounting apparatus 400 may cause the connector pieces 510, 512 to decouple from the connector pieces 506, 508 simultaneously.

The example digits and digit mounting apparatus provided in FIGS. 5A, 5B, and 5C and the accompanying description herein is for illustrative purposes only and should not be considered limiting. In an implementation, more than two or fewer than two digits may be attached to a digit mounting apparatus. In other examples, each digit may have a separate respective actuator, such that each digit may be actuated or moved independently.

In another implementation, a digit mounting apparatus may include at least one actuator that can cause a pivoting motion that includes solely a rotary motion. In yet another implementation, the pivoting motion may include a combined rotary and translational movement along a predefined path. In yet another implementation, a motion of a digit mounting apparatus (or a component thereof) that is used to couple to one or more digits may be an entirely translational motion. Additionally, when the one or more digits are attached to the robotic device, the actuator may cause the one or digits to move in a rotary and/or translational motion. In another example, the connection mechanism may include a linear connection track such that a linearly actuated device may couple to digit sets.

In another implementation of the digit interchange system, the coupling mechanism may include using the motion of the robotic device to interchange digits. For example, the coupling mechanism could utilize a passive catch, trigger, or pin that is engaged by the motion of the robotic device to attach to a digit set. Further, the motion of the robotic device may be used to release the digits by engaging the passive catch, trigger, or pin. In yet another implementation, the coupling mechanism may include one or more actuators in the holster in which the digit sets are stored. For example, the one or more actuators can attach or detach a digit set to a robotic arm that is placed near the holster.

In another implementation of the digit interchange system, one or more digits of a digit set may include sensorized digits. That is, a digit may include one or more sensors. As such, the connection mechanism may include an electrical connection that may allow for a transfer of data from the sensorized digits to the robotic device to which they are attached. For instance, the connection mechanism may include a plurality of pogo pins as the electrical connection between the robotic device and the digits.

Figure 6A:
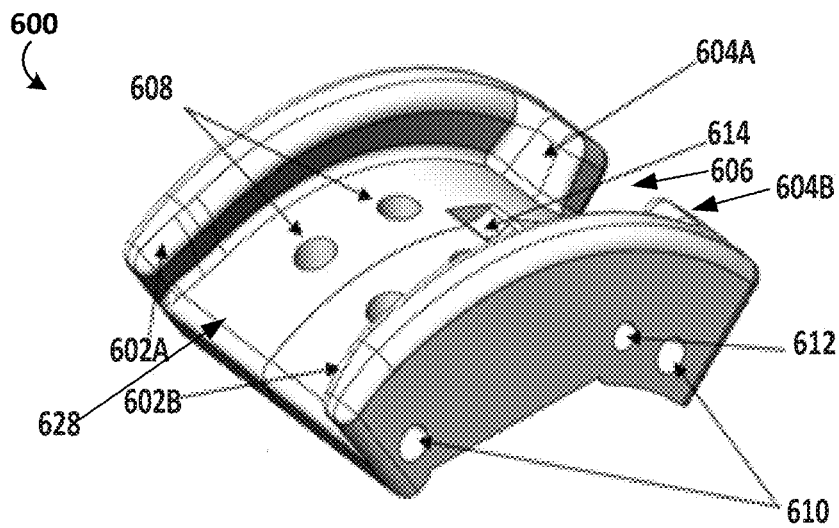
FIG. 6A illustrates a first connector piece, according to an example implementation.

FIG. 6A illustrates a first connector piece 600, according to an exemplary embodiment. The connector piece 600 may be coupled to a digit mounting apparatus and may include a first dovetail interface that can be mated with a complementary dovetail interface. As illustrated in FIG. 6A, a surface 628 of the connector piece 600 may be U-shaped. A first end of the connector piece 600 (i.e., the bottom of the U-shape) may include two hardstop faces 604A, 604B. The hardstop faces 604A, 604B may be separated by a gap 606. The gap may be referred to as an ejection gap 606. Further, the connector piece 600 may include two lead-in features 602A, 602B. The connector piece 600 may be attached to a digit mounting apparatus using screws that may be inserted in tap holes 608. The connector piece 600 may also be attached to the digit mounting apparatus using fasteners that are inserted in tap holes 610, 612 located on a side surface of the connector piece 600.

Figure 6B:
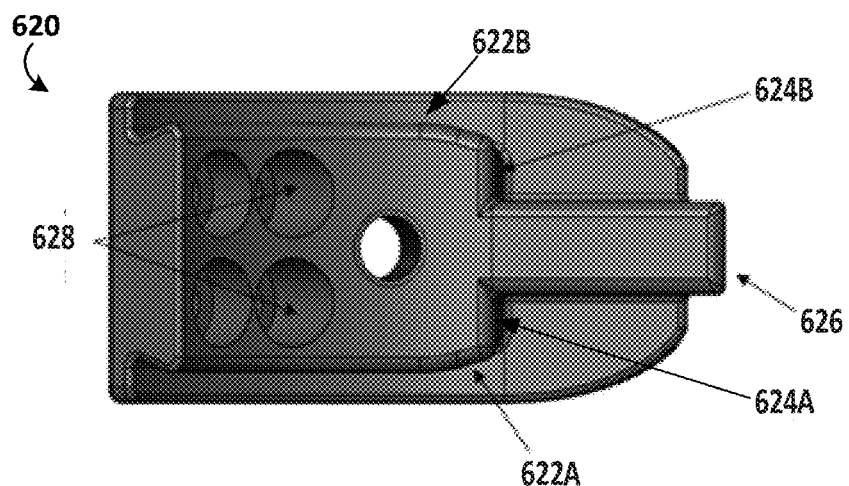
FIG. 6B illustrates a second connector piece, according to an example implementation.

FIG. 6B illustrates a second connector piece 620, according to an exemplary embodiment. The connector piece 620 may be coupled to a digit. As illustrated in FIG. 6B, the connector piece 620 may be have a dovetail interface complementary in shape to the dovetail interface of the connector piece 600 in FIG. 6A. The connector piece 620 may include two lead-in features 622A, 622B and two hardstop faces 624A, 624B. The two hardstop faces may be separated by an elongated feature 626 that protrudes from the body of the connector piece 620. The elongated feature 626 may be referred to as an ejection feature or as an engagement feature. The cavities that are formed by the features of the connector piece 620 may be collectively referred to as a track of the connector piece 620. Further, the connector piece 620 may include four digit mount counterbores 628.

Figure 6C:
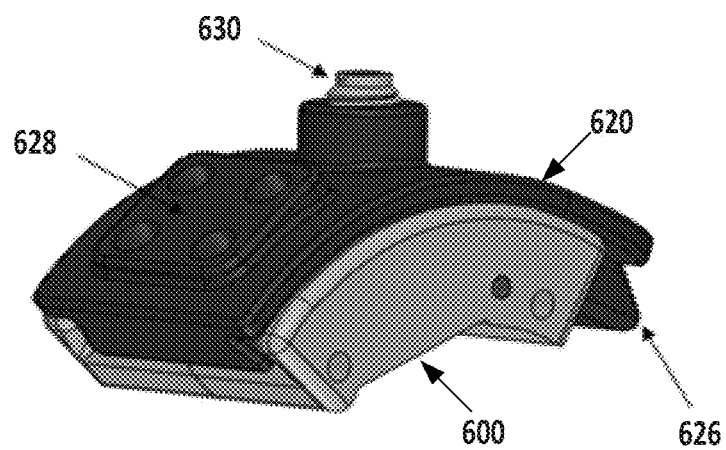
FIG. 6C illustrates two mated connector pieces, according to an example implementation.

FIG. 6C illustrates the connector pieces 600, 620 mated together, according to an exemplary embodiment. The connector piece 600 may be mated to the connector piece 620 by inserting the lead-in features 602A, 602B into the track of the connector piece 620. More specifically, the lead-in features 602A, 602B may slide into the lead-in features 622A, 622B respectively, until the hardstop faces 604A, 604B meet the hardstop faces 624A, 624B respectively. Further, the ejection tail 626 is inserted into the ejection gap 606. As illustrated in FIG. 6C, the ejection feature 626 may continue out the back of the connector piece 600 once the two connector pieces are mated.

Figure 6D:
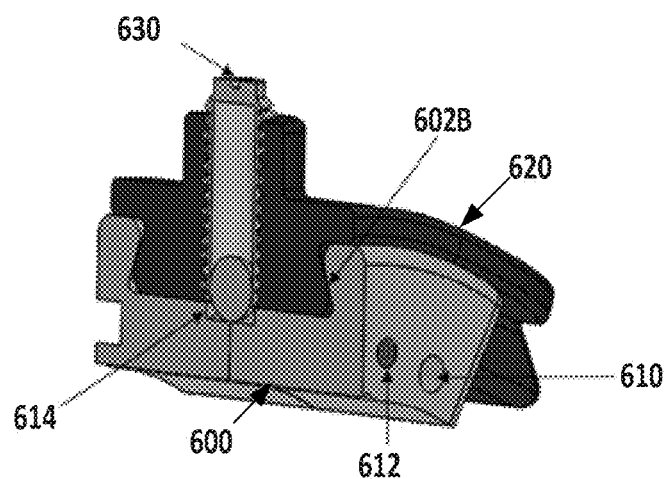
FIG. 6D illustrates a cross-section of two mated connector pieces, according to an example implementation.

FIG. 6D illustrates a cross-sectional view of the mated connector pieces, according to an exemplary embodiment. As illustrated in FIG. 6D, a ball nose spring plunger 630, which may be attached to a digit, may be inserted in a cavity in the connector piece 620. The top of the spring 630 may engage the detent 614 of the connector piece 600. This mechanism may reinforce the connection between the two connector pieces. That is, the mechanism may prevent the connector piece 600 from wobbling around or sliding off the track of the connector piece 620.

The example connection mechanism provided in FIGS. 6A, 6B, 6C and 6D and the accompanying description herein is for illustrative purposes only and should not be considered limiting. In an implementation, the connection mechanism may include connector pieces of any shape. That is, the connector pieces may be any interlocking/undercut cross-sectional interface. In another implementation, the connection mechanism may include any type of spring that may couple between the connector pieces. For example, the connection mechanism may include a leaf spring instead of or in addition to a ball spring plunger.

In yet another implementation, the connection mechanism may include any type of coupling mechanism that may couple between the connector pieces. For example, the connection mechanism may include a magnet in a digit mounting apparatus and/or in a digit. In one example, a metal piece of a digit may couple to a magnet in the digit mounting apparatus. In another example, a metal piece of a digit mounting apparatus may couple to a magnet in a digit. Further, more than one connection mechanism may be used to couple the connector pieces.

In yet another implementation, the engagement feature of the connection mechanism may be one or more pins that jut out from the sides of a digit. The one or more pins may be nestled into a V-shaped engagement feature in a holster. Other engagement features are possible.

Yet further, the connector pieces disclosed herein may be connected to any digit. For example, one or more of the digit sets may be created by end-users and/or designers. The digits may include threaded holes such that a digit connector piece (e.g., the digit connector piece 620 in FIG. 6B) may be connected to the digits using screws that may be inserted in counterbores of the digit connector piece. As such, a robotic device may couple to any digit using the interconnection mechanism described herein. As the digit connector piece may couple with any digit, the robotic device may use the digit interchange system to perform any task for which a digit is available.

Figure 7:
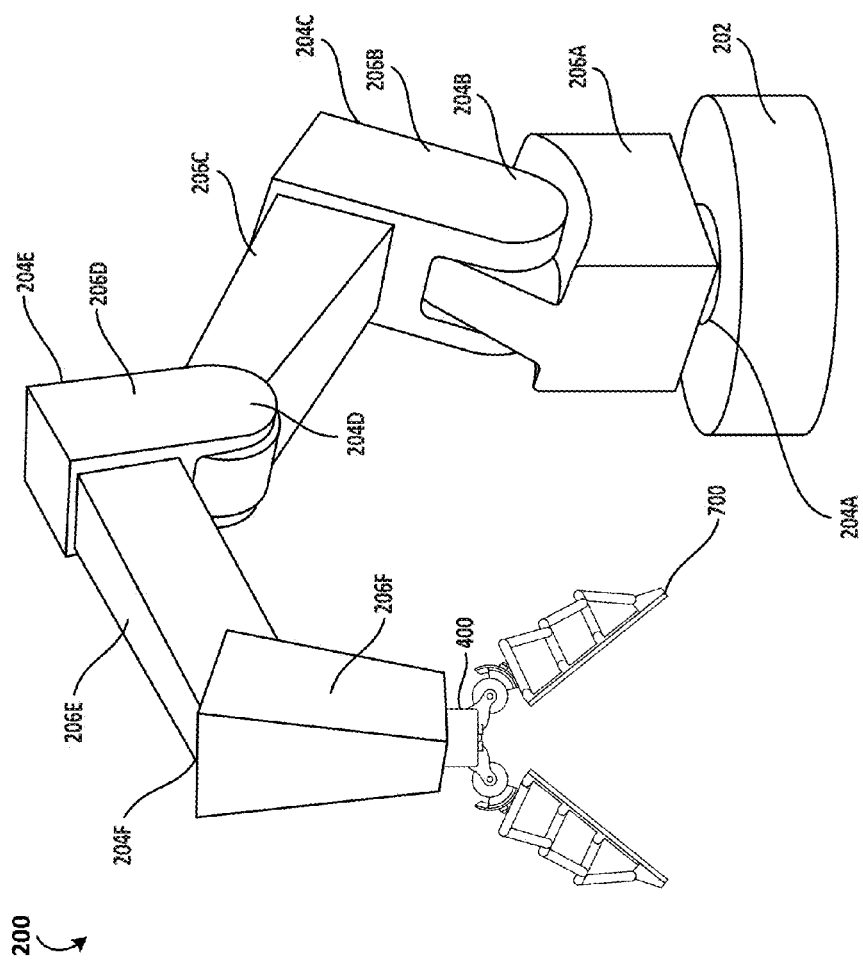
FIG. 7 illustrates a gripper digit set coupled to a robotic arm, according to an example implementation.

FIG. 7 illustrates a digit set 700 attached to a robotic arm 200. More specifically, the digit set 700 is coupled to the robotic arm 200 via the digit mounting apparatus 400. The digits of the digit set 700 may be configured such that movement of a first digit can occur while movement of a second digit is prevented, such as by an object or the environment (e.g., a wall, table, or other body in an environment) in which the robotic device exists. Further, when a first of the two digits is prevented from movement because it has contacted an object or the environment, the second digit may move or may continue to move. In another example, where three or more digits are included, the attached digits may be arranged in two groups opposing each other, such that when they are actuated they close toward each other. Two digits may be positioned opposite the third, such that when the digits close they interlock.

Further, the robotic arm 200 may include a holster in which digits may be stored. The holster may be located in an area that may be accessed by a robotic device. For example, the holster may be coupled to the body of the robotic arm 200 (e.g., coupled to the base of the robotic arm 200). In another example, the holster may be located near the robotic arm 200. For instance, the holster may be located within reach of the robotic arm 200. The holster may also include other components that may be attached to the robotic arm 200, such as preshaper components for underactuated digits.

IV. Example Operations

Figure 8:
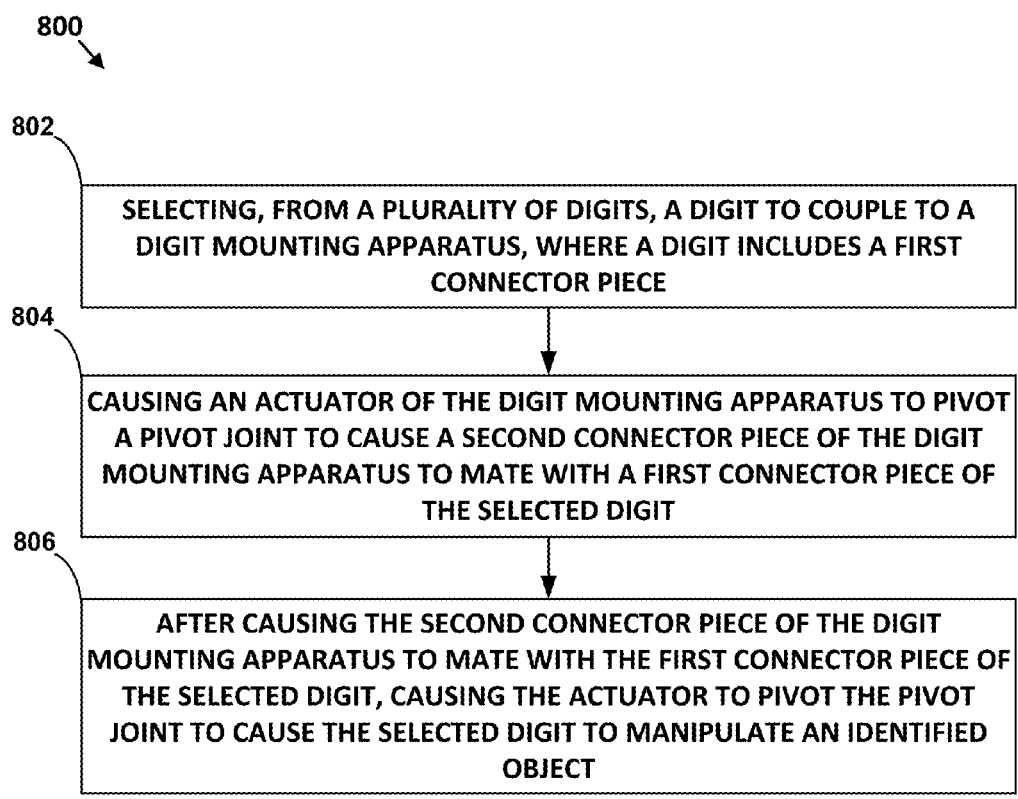
FIG. 8 illustrates an example method, according to an example implementation.

FIG. 8 is a block diagram of an example method 800, according to an example embodiment. The blocks of method 800 may be carried out by a control system of a robotic device that includes a robotic interchange system described in FIGS. 4-7. Further, part or all of method 800 may be carried out by a local control of a robotic device, such as control system 118 illustrated in FIG. 1. In additional examples, part or all of method 800 may be carried out by a remote control system of a robotic device.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 8. Where used, program code can be stored on any type of computer-readable medium, for example, such as a storage device including a disk or hard drive.

In addition, each block of the flowchart shown in FIG. 8 may represent circuitry that is wired to perform the specific logical functions in the process. Unless specifically indicated, functions in the flowchart shown in FIG. 8 may be executed out of order from that shown or described, including substantially concurrent execution of separately described functions, or even in reverse order in some examples, depending on the functionality involved, so long as the overall functionality of the described method is maintained. Furthermore, although the method 800 is describes a method of interchanging a detachable digit, one of ordinary skill in the art may modify the method 800 to interchange more than one digit.

At block 802, the method 800 may include selecting, from a plurality of digits, a digit to couple to a digit mounting apparatus, where a digit includes a first connector piece. The plurality of digits may be accessible to the robotic device and may include different types of digits. Further, a digit connector piece may be coupled to each digit.

In an embodiment, the robotic device may select one or more digits in order to perform an assigned task. In an example, the assigned task may be a task for which the digit interchange system includes a task specific digit or digit set. In such an example, the robotic device may select the task specific digit or digit set. For instance, the assigned task may require a screwdriver. As such, the robotic device may select a digit that includes a screwdriver in order to perform the task.

In another embodiment, the robotic device may select one or more digits based on one or more characteristics of a target object associated with the task. For example, the assigned task may be to grasp a target object. Accordingly, the control system may identify the target object for the robotic device to grasp, grip, pinch, grab, or hold. In some examples, the object may be identified by a remote operator and/or computing system coupled to the robotic device. Further, the robotic device may determine one or more characteristics of the target object in order to select one or more digits to perform the task. For example, the robotic device may determine the object's shape, orientation, profile, size, or other characteristic. The determination may be made based on received sensor data from one or more sensors, such as a visual sensor, touch sensor, pressure sensor, or other sensor, for example.

Some characteristics of the target object used in this determination may include the size, shape, profile view, flatness, weight, fragility, material, plasticity, or another characteristic. In making the determination, a characteristic may refer to a single characteristic, or may refer to one or more characteristics combined together. In an embodiment, the robotic device may identify one or more features, such as gripping features, in the target object. For example, the robotic device may identify a pole or handle in the target object. In this case, the robotic device may select one or more digits that can curl around the pole or handle such that the fingertips connect, creating a circular grip around the pole or handle. Other gripping features may include lifts, handles, knobs, or any other feature that may be gripped by one or more digits.

In another embodiment, the robotic device may select one or more digits based on the material properties of the target object. For example, the robotic device may select one or more digits based on the texture of the target object. The selected one or more digits may include gripper digits with a deformable surface that is made with a material that may provide a high contact friction when the target object is grasped. In another example, the robotic device may select one or more digits based on the slickness or wetness of the target object. For instance, one or more digits that include wide gripper surfaces may be selected, as a wet target object may be gripped more robustly using digits that grip the target object along a wide contact patch than narrow digits that grip the object along a narrow contact patch.

In another embodiment, the robotic device may select one or more digits based on the shape of the target object. Identifying shapes of the identified object may allow the robotic device to select one or more digits that can curl around a shape (i.e., encompassing grip) which may allow the robotic device to have a strong grip on the target object. For example, the target object may be a bottle with a conically shaped neck. In such an example, the robotic device may select one or more digits that can curl around the conical shape such that the fingertips connect.

In another embodiment, one or more digits may be selected based on the environment of the identified object. For example, the robotic device may identify any objects in the environment of the target object. If the environment includes several objects near the target object, the robotic device may select one or more digits that would be easy to maneuver towards the target object without colliding with any other objects near the target object.

In another embodiment, the robotic device may select one or more digits based on a predicted amount of force/torque that the one or more digits may need to perform a task. In an example, the robotic device may select the one or more digits that require the least amount of force/torque to perform a task from the plurality of digits. As explained above, the ability to select one or more digits such that the force/torque required to perform a task is decreased may allow for a robotic device that may perform a wide range of tasks with a small actuator. A small actuator decreases the size, cost, and complexity of the robotic device.

The amount of force/torque required for a task may depend on the dimensions and shape of the target object. The center of mass, which may be used to calculate the force/torque, may be estimated based on the shape of the object. In an example, the robotic device may calculate the force/torque, based on the estimated center of mass, that one or more digits may require to perform a task. The robotic device may select the one or more digits that require the least amount of force/torque to perform a task.

In another example, the robotic device may determine predicted points of contact and/or a predicted contact patch that one or more digits may have with a target object. The higher the number of contact points and/or larger the contact patch that the one or more digits may have with a target object, the less force/torque that may be required to perform the task. As such, the robotic device may select the one or more digits that may have the greatest number of contact points and/or largest contact patch with the target object when grasping the target object. For instance, the robotic device may select one or more digits that can make contact with the full interior length of the target object when gripping the target object (i.e., an encompassing grip). In some examples, the one or more digits that can make a contact with the full interior length of the target object may be a small and optimized contact patch. For instance, a long and skinny digit that wraps fully around a round object like a bottle may be selected over a wide digit that has a larger contact patch but cannot wrap around the object.

In some examples, the amount of force/torque needed to perform a task may be similar for two or more of the digits. For example, the robotic device may grasp the target object only along a specified length (regardless of the length of the digits used). As such, the force/torque to grasp an object may be similar for digits that can grasp the target object along the same length (since the distance from where the digits are grasping to the center of mass is similar). In such an example, the robotic device may select one or more wide digits rather than narrow digits as the wide digits may be better leveraged than narrow digits.

In another embodiment, a robotic device may be trained using a machine learning process to determine which one or more digits may be used for a specific object type/classification or an object with specific characteristics. For example, the robotic device may use an iterative loop of testing (e.g., trial and error) to determine one or more digits that may be used with an identified object. For instance, the robotic device may attempt a task with a digit set of one or more digits. If the task fails the robotic device may attempt the task with different digits. In another example, the robotic device may attempt the task with a different digit set in response to detecting a high force/torque required to perform the task with the currently selected digit(s). In yet another, the robotic device may attempt the task with a different digit set in response to detecting slippage of an object with the currently selected digit(s).

Further, the robotic device may associate one or more characteristics of the identified object with the determined one or more digits. As such, the robotic device may select the determined one or more digits when it identifies the characteristics associated with the one or more digits in other objects. Additionally and/or alternatively, the robotic device may receive data indicative of characteristics that are associated with one or more digits. The received data may be machine learning data from a similar robotic device.

In another embodiment, the robotic device may use more than one of the considerations described above to make a determination. In an example, the robotic device may determine that more than one digit set may be used to grasp an object without colliding into other objects. In such an example, the robotic device may select the digit set that requires the least amount of force/torque to perform the task from the digit sets that can perform the task without colliding into other objects.

In other examples, the robotic device may determine to use a preshaper component with a selected one or more digits. The preshaper component may be positionable between digits. In some examples the preshaper component may be a cylinder or rectangular block. For example, when two digits are moved toward each other by the actuator and the deformable gripping surface of each finger contacts a preshaper component, the deformable gripping surface of each digit may be deformed by the preshaper component such that the fingertips of each digit are curled inward toward each other.

At block 804, the method 800 may include causing an actuator of the digit mounting apparatus to pivot a pivot joint to cause a second connector piece of the digit mounting apparatus to mate with the first connector piece of the selected digit. As explained above, the digit mounting apparatus connector pieces may be mated to the digit connector pieces using a motion of the digit mounting apparatus connector pieces. As such, the robotic device may cause the actuator to move the digit mounting apparatus connector piece to mate with the connector piece of the selected digit.

At block 806, the method 800 includes causing the actuator to pivot the pivot joint to cause the selected digit to manipulate an identified object. Actuating the digit may include rotating the digit about a fixed axis. Actuating the digits of a digit set may include rotating the digits about a respective fixed axis, such that the digits move from an open state to a closed state. In some examples, this may include gripping the sides or edges of the identified object (e.g., a credit card or business card). In another example, the target object may be an object such as a jug or container. In that case, the selected digit, when actuated, may curl around the lip of the jug from the inside. The digit may then grasp the jug from the inside. In other examples, the robotic device may further actuate two or more digits of a digit set such that the fingertips of the digits make contact with each other. In this instance, the identified object may be a handle or pole, which is surrounded by the grip of the robotic gripping device in a pincer-like manner.

A further step may include receiving sensor data from sensors that may be included in the selected digit. One or more sensors may be included on the digit to collect information about positioning, various angles of the phalanges of the digit, pressures at various points on the digit, and other data. The received sensor data may then be used to confirm a successful grasp, or to determine the best grasp position and/or preshaper component for a given object. Other uses are possible as well.

Another further step may include detaching the digit from the digit mounting apparatus. The robotic device may determine to detach the digit in response to determining that a task has been completed or that a new task that requires a different digit has been assigned. The robotic device may also determine to detach the digit if the digit fails in performing the current task. Detaching the digit may include placing the digit in its holding area in a holster such that an engagement feature of the digit engages an engagement feature in the holster. Once the digit is in the holster, the robotic device may cause the digit mounting apparatus actuator to pivot the pivot joint to cause the digit mounting apparatus connector piece to detach from the digit connector piece of the digit. In an embodiment, a digit set may be placed in the holster while the digit set is in a closed state.

V. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A robotic device, comprising:
a first detachable digit, comprising a first connector piece; and
a digit mounting apparatus, comprising:
a first pivot joint;
a second connector piece coupled to the first pivot joint, wherein the second connector piece is configured to mate with the first connector piece of the first detachable digit; and
an actuator configured to pivot the first pivot joint about a first axis to cause the second connector piece of the digit mounting apparatus to mate with the first connector piece of the first detachable digit to attach the first detachable digit to the digit mounting apparatus, wherein when the first connector piece is mated with the second connector piece, the actuator is configured to pivot the first detachable digit by causing the first pivot joint to pivot about the first axis.

2. The robotic device of claim 1, wherein the second connector piece comprises a U-shaped cavity, and wherein the first connector piece comprises a complementary shape to the U-shaped cavity of the second connector piece.

3. The robotic device of claim 2, wherein the second connector piece and the first connector piece interlock by sliding first lead-in features of the second connector piece into complementary second lead-in features of the first connector piece until at least one hardstop feature of the second connector piece meets at least one hardstop feature of the first connector piece.

4. The robotic device of claim 1, wherein the second connector piece comprises a detent, and wherein the first detachable digit comprises a spring loaded device configured to engage the detent of the second connector piece when the second connector piece is mated with the first connector piece.

5. The robotic device of claim 4, wherein the spring loaded device is a ball-nose spring plunger.

6. The robotic device of claim 1, wherein an engagement feature on the first detachable digit is configured to engage a complementary engagement feature in a holster when the first detachable digit is placed in the holster, and wherein when the first detachable digit is placed in the holster, the actuator is configured to pivot the first pivot joint about the first axis to cause the second connector piece of the digit mounting apparatus to detach from the first connector piece of the first detachable digit to detach the first detachable digit from the digit mounting apparatus.

7. The robotic device of claim 1, further comprising a second detachable digit comprising a third connector piece, wherein the first detachable digit and the second detachable digit comprise opposable digits of a digit set, and wherein the digit mounting apparatus further comprises:
a second pivot joint; and
a fourth connector piece coupled to the second pivot joint, wherein the fourth connector piece is configured to mate with the third connector piece of the second detachable digit, and
wherein the actuator is configured to pivot the second pivot joint about a second axis to cause the fourth connector piece of the digit mounting apparatus to mate with the third connector piece of the second detachable digit to attach the second detachable digit to the digit mounting apparatus.

8. The robotic device of claim 7, wherein when the second connector piece is mated with the first connector piece of the first detachable digit and the fourth connector piece is mated with the third connector piece of the second detachable digit, the actuator is configured to pivot the first and second pivot joints to move the opposable digits of the digit set towards and away from each other within a plane of motion perpendicular to the first axis and the second axis.

9. A method comprising:
selecting, from a plurality of digits, a digit to couple to a digit mounting apparatus, wherein the selected digit comprises a first connector piece, and wherein the digit mounting apparatus comprises a pivot joint and a second connector piece coupled to the pivot joint;
causing an actuator of the digit mounting apparatus to pivot the pivot joint to cause the second connector piece of the digit mounting apparatus to mate with the first connector piece of the selected digit; and
after causing the second connector piece of the digit mounting apparatus to mate with the first connector piece of the selected digit, causing the actuator to pivot the pivot joint to cause the selected digit to manipulate an identified object.

10. The method of claim 9, wherein selecting the digit is based on one or more characteristics of the identified object, wherein the one or more characteristics comprise: dimensions of the identified object, a shape of the identified object, a weight of the identified object, a fragility of the identified object, and a texture of the identified object.

11. The method of claim 10, further comprising:
determining, based on the one or more characteristics, a respective predicted amount of torque for each digit of the plurality of digits to manipulate the identified object; and
selecting the digit to couple to the digit mounting apparatus based on the respective predicted amount of torque for each digit to manipulate the identified object.

12. The method of claim 11, further comprising:
selecting the digit with a least amount of respective predicted torque to manipulate the identified object.

13. The method of claim 10, further comprising:
determining, based on the one or more characteristics, a respective predicted contact patch of each digit of the plurality of digits with the identified object; and
selecting the digit to couple to the digit mounting apparatus based on the respective predicted contact patch of each digit with the identified object.

14. The method of claim 13, further comprising:
selecting the digit with a largest respective predicted contact patch with the identified object.

15. The method of claim 9, further comprising:
inserting the digit into a holster, wherein inserting the digit into the holster causes an engagement feature of the digit to engage a complementary engagement feature in the holster; and
causing the pivot joint to pivot to decouple the second connector piece of the digit mounting apparatus from the first connector piece of the digit.

16. A robotic device comprising:
a plurality of detachable digits, wherein each digit comprises a respective first connector piece;

a digit mounting apparatus, comprising:
- a first pivot joint;
- a second connector piece coupled to the first pivot joint, wherein the second connector piece is configured to mate with the respective first connector piece of each digit of the plurality of digits; and
- an actuator configured to pivot the first pivot joint about a first axis; and a control system configured to:
- select, from the plurality of digits, a first digit to couple to the digit mounting apparatus;
- cause the actuator of the digit mounting apparatus to pivot the first pivot joint to cause the second connector piece of the digit mounting apparatus to mate with a respective first connector piece of the first digit; and
- after causing the second connector piece of the digit mounting apparatus to mate with the respective first connector piece of the first digit, cause the actuator to pivot the first pivot joint to cause the first digit to manipulate an identified object.

17. The robotic device of claim 16, wherein the plurality of digits further comprise a second plurality of opposable digits corresponding to the plurality of digits, wherein an opposable digit corresponding to the first digit comprises a third connector piece, wherein the digit mounting apparatus further comprises a second pivot joint and a fourth connector piece coupled to the second pivot joint, and wherein the actuator is configured to rotate the second pivot joint about a second axis.

18. The robotic device of claim 17, wherein the control system is further configured to:
- cause the actuator to pivot the first and second pivot joints to cause the second and fourth connector pieces of the digit mounting apparatus to mate with the first and third connector pieces of the first digit and the corresponding opposable digit respectively; and
- after causing the second and fourth connector pieces of the digit mounting apparatus to mate with the first and third connector pieces of the first digit and the corresponding opposable digit respectively, cause the actuator to pivot the first and second pivot joints to cause the first digit and the corresponding opposable digit to move towards each other to grasp the identified object.

* * * * *